(12) United States Patent
Koga et al.

(10) Patent No.: US 9,705,721 B2
(45) Date of Patent: Jul. 11, 2017

(54) COMMUNICATION APPARATUS AND COMMUNICATION METHOD

(71) Applicant: PANASONIC INTELLECTUAL PROPERTY MANAGEMENT CO., LTD., Osaka (JP)

(72) Inventors: Hisao Koga, Fukuoka (JP); Shigekiyo Nosaka, Fukuoka (JP); Koji Ikeda, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/949,571

(22) Filed: Nov. 23, 2015

(65) Prior Publication Data

US 2016/0149740 A1 May 26, 2016

Related U.S. Application Data

(63) Continuation-in-part of application No. PCT/JP2015/004992, filed on Sep. 30, 2015.
(Continued)

(51) Int. Cl.
*H04L 27/26* (2006.01)
*H04L 5/00* (2006.01)
*H04B 3/54* (2006.01)

(52) U.S. Cl.
CPC ........... *H04L 27/2621* (2013.01); *H04B 3/54* (2013.01); *H04L 5/0005* (2013.01)

(58) Field of Classification Search
CPC ...... H04L 27/2621; H04L 5/0005; H04B 3/54
See application file for complete search history.

(56) References Cited

U.S. PATENT DOCUMENTS 7,864,658 B2   1/2011   Wakisaka et al.
8,175,177 B2   5/2012   Wang
(Continued)

FOREIGN PATENT DOCUMENTS

JP   2007-506349 A   3/2007
JP   2007-124656 A   5/2007
(Continued)

OTHER PUBLICATIONS

PCT Search Report dated Dec. 1, 2015, for corresponding PCT Application No. PCT/JP2015/004993, 6 pages.
(Continued)

*Primary Examiner* — Dac Ha
(74) *Attorney, Agent, or Firm* — Seed IP Law Group LLP

(57) ABSTRACT

A communication apparatus performs a communication using a communication frame corresponding to a predetermined frequency bandwidth including a first frequency bandwidth and a second frequency bandwidth. The communication frame includes a first communication channel that corresponds to the first frequency bandwidth and that has a plurality of subcarriers and a second communication channel that corresponds to the second frequency bandwidth and that has a plurality of subcarriers. The communication apparatus sets a first phase vector with respect to the first communication channel, sets a second phase vector with respect to the second communication channel, generates communication data by adjusting a phase of symbol data using the first phase vector and the second phase vector, and transmits the communication data using the communication frame.

12 Claims, 19 Drawing Sheets

Related U.S. Application Data

(60) Provisional application No. 62/083,810, filed on Nov. 24, 2014.

(56) References Cited

U.S. PATENT DOCUMENTS

| | | |
|---|---|---|
| 2005/0078803 A1 | 4/2005 | Wakisaka et al. |
| 2007/0092017 A1 | 4/2007 | Abedi |
| 2007/0189334 A1* | 8/2007 | Awad .................. H04L 27/2621 370/491 |
| 2009/0052577 A1 | 2/2009 | Wang |
| 2013/0322563 A1* | 12/2013 | Van Zelst ........... H04L 27/2621 375/295 |
| 2014/0146900 A1* | 5/2014 | Dabak ................... H04B 3/542 375/257 |
| 2014/0153507 A1* | 6/2014 | Yang .................. H04L 27/2602 370/329 |
| 2014/0160915 A1 | 6/2014 | Chen |
| 2015/0117569 A1* | 4/2015 | Zheng .................. H04L 5/0048 375/302 |

FOREIGN PATENT DOCUMENTS

| | | |
|---|---|---|
| JP | 2009-212967 A | 9/2009 |
| JP | 2010-109470 A | 5/2010 |
| JP | 2010-537469 A | 12/2010 |
| JP | 2013-090239 A | 5/2013 |
| JP | 2014-110585 A | 6/2014 |

OTHER PUBLICATIONS

PCT Search Report dated Nov. 24, 2015, for corresponding PCT Application No. PCT/JP2015/004992, 7 pages.

* cited by examiner

Fig.14

| DATA TYPE | NUMBER OF SYMBOLS | MODULA-TION TYPE [PAM] | FEC MODE | FRAME MODE | MAXIMUM PHY RATE [Mbps] |
|---|---|---|---|---|---|
| FC | 8, 10, 30 | 2 | CC(1/2), RS(50,34) - CC(1/2) | 4 freq. & 1 time copies<br>10 freq. & 4 time copies<br>10 freq. & 12 time copies | |
| Frame body (DOF) | VARIABLE | 2 | CC(1/2), RS(56,40) - CC(1/2), LDPC(1/2) | 2 freq. & 1 time copies<br>2 freq. & 2 time copies<br>4 freq. & 1 time copies<br>5 freq. & 1 time copies<br>5 freq. & 2 time copies<br>10 freq. & 1 time copies<br>10 freq. & 2 time copies<br>10 freq. & 4 time copies<br>10 freq. & 8 time copies | 4.9<br>2.4<br>1.8<br>2<br>1<br>1<br>0.5<br>0.2<br>0.1 |
| Frame body | VARIABLE | D2 to 32 | RS(255,239), RS - CC(1/2-7/8), LDPC(1/2-4/5) | Normal (no diversity) | 93 |

Fig.15

| ELEMENT VALUE OF PHASE VECTOR | | AMOUNT OF PHASE ROTATION |
|---|---|---|
| -1 | → | $\pi$ |
| 1 | | 0 |
| 1 | | 0 |
| 1 | → | 0 |
| -1 | | $\pi$ |
| -1 | | $\pi$ |
| 1 | | 0 |
| . | → | . |
| . | | . |
| . | | . |

COMMUNICATION APPARATUS AND COMMUNICATION METHOD

BACKGROUND

1. Field of the Invention

The present disclosure relates to a communication apparatus and a communication method.

2. Description of the Related Art

A plurality of subcarriers modulated by different data overlap each other in OFDM (Orthogonal Frequency Division Multiplexing) communication. For this reason, a peak to average power ratio (PAPR) has a tendency to increase.

A phase adjustment method is proposed in order to reduce a PAPR. The phase adjustment method includes a selected mapping (SLM) method. In the SLM method, a block of data constituting an OFDM symbol is multiplied by U (U>1) available phase vectors. The available phase vector has N phase elements, and each phase element corresponds to one of N subcarriers individually.

That is, it is known that when a communication apparatus that performs a communication in accordance with OFDM sets a phase vector with respect to data to be transmitted, a phase vector having a lowest PAPR is selected from a plurality of phase vectors (see, for example, JP-A-2007-124656).

SUMMARY

In a technique disclosed in JP-A-2007-124656, when distortion occurs in a transmission path, a reduction in PAPR on a receiving apparatus is insufficient.

The present disclosure is contrived in view of such circumstances, and an object thereof of the present disclosure is to provide a communication apparatus and a communication method which are capable of improving the reduction performance of a PAPR on a receiving apparatus even when a state of a transmission path is deteriorated.

A communication apparatus of the present disclosure performs a communication using a communication frame corresponding to a predetermined frequency bandwidth including a first frequency bandwidth and a second frequency bandwidth. The communication apparatus includes a processor and a communicating device. The communication frame includes a first communication channel that corresponds to the first frequency bandwidth and that has a plurality of subcarriers and a second communication channel that corresponds to the second frequency bandwidth and that has a plurality of subcarriers. The processor sets a first phase vector with respect to the first communication channel, sets a second phase vector different from the first phase vector with respect to the second communication channel, and generates communication data by adjusting a phase of symbol data using the first phase vector and the second phase vector. The communicating device transmits the communication data using the communication frame.

According to the present disclosure, it is possible to improve the reduction performance of a PAPR on a receiving apparatus even when the state of a transmission path is deteriorated.

BRIEF DESCRIPTION OF THE DRAWINGS

FIG. 14 is a schematic diagram in which an example of a communication system is compiled for each item.

FIG. 15 is a schematic diagram illustrating a relationship between each element of a phase vector and the amount of phase rotation.

DESCRIPTION

Hereinafter, embodiments will be described in detail with reference to the accompanying drawings as appropriately. However, more detailed description than necessary may not be given. For example, detailed description of already well-known matters or redundant description of substantially the same components as those previously stated will not be given. This is intended to prevent the following description from being unnecessarily lengthy and to facilitate understanding by those skilled in the art. Meanwhile, the accompanying drawings and the following description are provided in order to allow those skilled in the art to sufficiently understand the present disclosure, and are not intended to restrict the subject matter described in the claims.

(Background to an Aspect of the Present Disclosure)

A transmission apparatus and a receiving apparatus communicate data through a transmission path. When a state of the transmission path is ameliorated, little deterioration in a communication signal occurs. Therefore, when a phase vector having a lowest PAPR is selected by the transmission apparatus, the PAPR also becomes lower on the receiving apparatus.

On the other hand, even when the phase vector having a lowest PAPR which is set in the transmission apparatus is selected in a case where the state of the transmission path is deteriorated, the PAPR deteriorates on the receiving apparatus.

Figure 19:
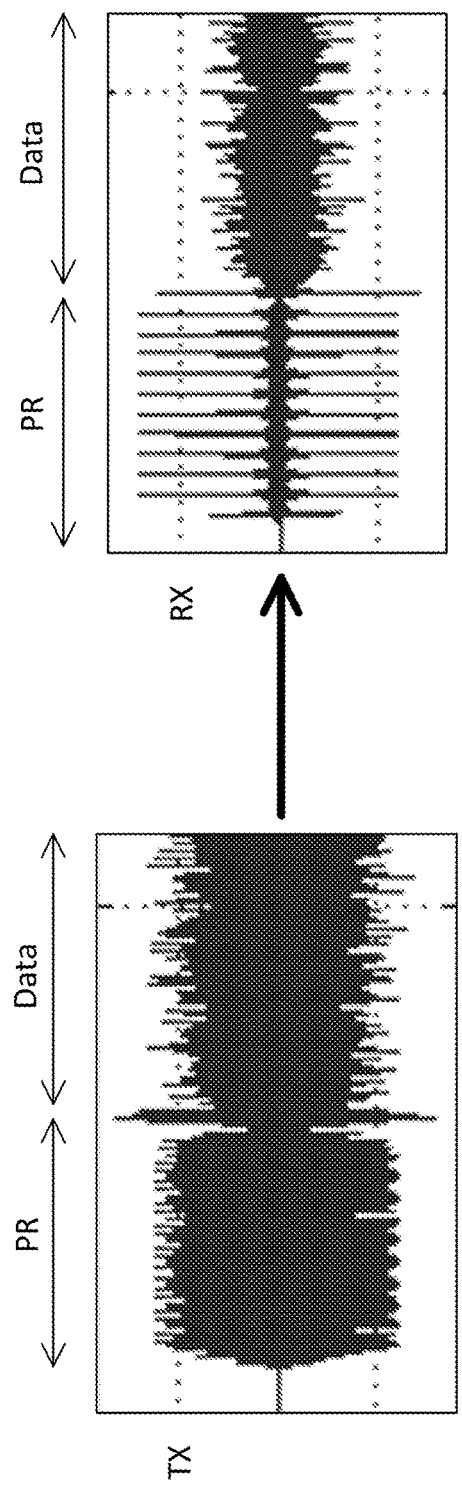
FIG. 19 is a waveform diagram illustrating a relationship between a time and a signal voltage in a transmission apparatus and a relationship between a time and a signal voltage in a receiving apparatus, when the state of a power line in the related art is deteriorated.

FIG. 19 is a waveform diagram illustrating a relationship between a time and a signal voltage in a transmission apparatus (TX) and a relationship between a time and a signal voltage in a receiving apparatus (RX) when the state of a transmission path of the related art is deteriorated.

As shown in FIG. 19, the signal level of a received signal on the receiving apparatus becomes lower than that on the transmission apparatus. In addition, particularly, as compared to the transmission apparatus, a time position having a high signal voltage and a time position having a low signal voltage are alternately repeated in a preamble of a received signal on the receiving apparatus, and the PAPR on the receiving apparatus becomes higher.

A dynamic range is set in accordance with a width of the maximum value and the minimum value of a signal voltage shown in FIG. 19. For this reason, when the PAPR on the receiving apparatus becomes higher, it is difficult to effectively utilize the dynamic range of an ADC (Analog to Digital Converter) of the receiving apparatus, and the S/N ratio (Signal to Noise Ratio) of a communication frame deteriorates. For example, it is difficult to sufficiently reproduce a signal at a time position having a low signal voltage. In addition, the receiving apparatus is required to include an amplifier having a wide dynamic range in order to effectively utilize the dynamic range of the ADC of the receiving apparatus. Therefore, when the state of a transmission path is deteriorated, it is difficult to reduce the PAPR on the receiving apparatus.

Hereinafter, a description will be given of a communication apparatus and a communication method which are capable of improving the reduction performance of the PAPR on the receiving apparatus even when the state of the transmission path is deteriorated.

First Embodiment

[Configurations and the Like]

Figure 1:
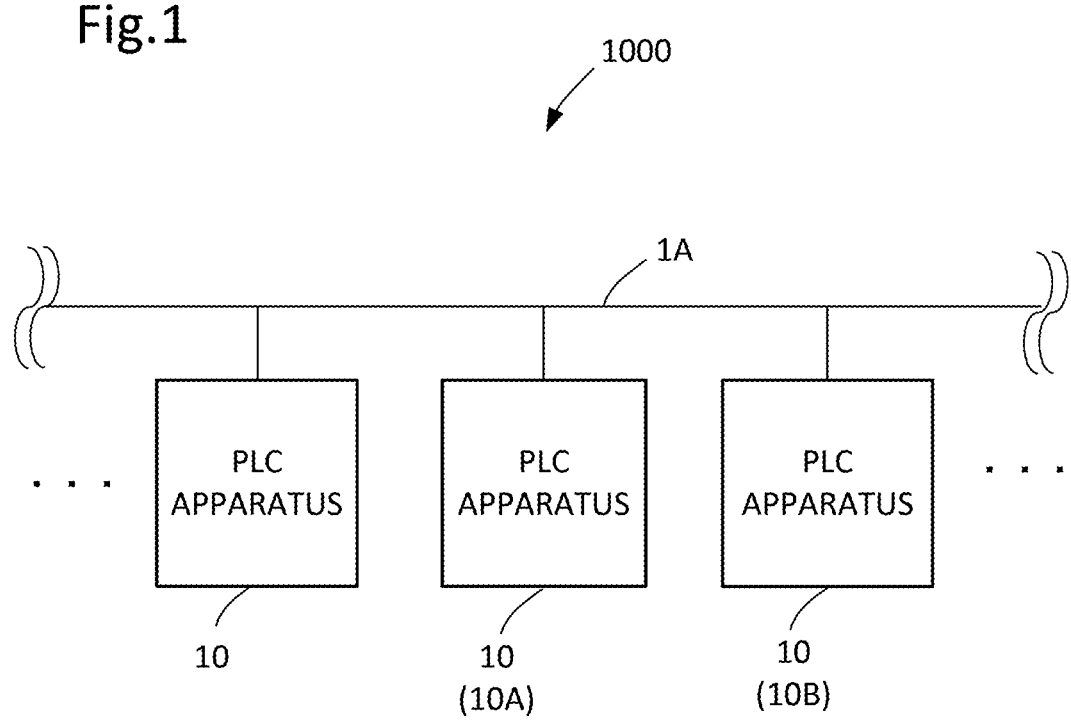
FIG. 1 is a block diagram illustrating a configuration example of a communication system in a first embodiment.

FIG. 1 is a schematic diagram illustrating a configuration example of a communication system 1000 in a first embodiment. In the communication system 1000, a plurality of PLC (Power Line Communication) apparatuses 10 are connected to a power line 1A. The PLC apparatus 10 performs a power line communication, for example, in conformity to the standard of IEEE (The Institute of Electrical and Electronics Engineers) 1901.

The PLC apparatus 10 may be, for example, a PLC modem or an electrical instrument having a PLC modem built-in. This electrical instrument includes, for example, household electrical appliances such as a television, a telephone, a video cassette recorder, and a set-top box, or office instruments such as a personal computer, a facsimile, and a printer. In addition, the PLC apparatus 10 includes infrastructure instruments such as a smart meter, or IoT (Internet of Things) instruments such as a security camera and a sensor instrument.

Figure 2:
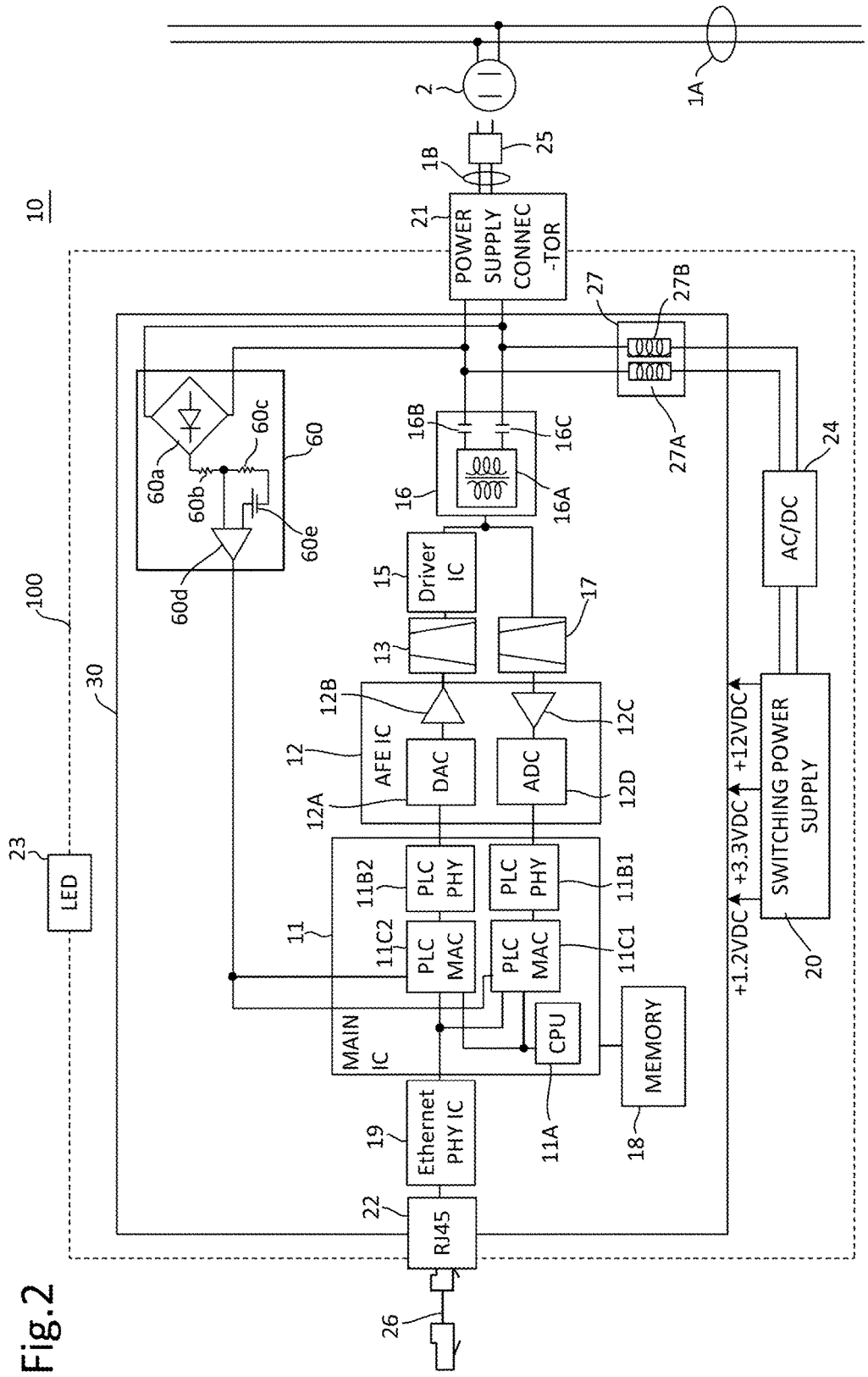
FIG. 2 is a schematic diagram illustrating a hardware configuration example of a PLC apparatus.

FIG. 2 is a block diagram illustrating a hardware configuration example of the PLC apparatus 10. The PLC apparatus 10 includes a circuit module 30 and a switching power supply 20.

The switching power supply 20 supplies various types of voltage (for example, +1.2 V, +3.3 V, and +12 V) to the circuit module 30, and includes, for example, a switching transformer and a DC-DC converter (both are not shown in the drawing). Power to the switching power supply 20 is supplied from a power supply connector 21 through an impedance upper circuit 27 and an AC-DC converter 24. The power supply connector 21 is provided, for example, on the back surface of a housing 100 included in the PLC apparatus 10.

The circuit module 30 includes a main IC (Integrated Circuit) 11 and an AFE IC (Analog Front END Integrated Circuit) 12. In addition, the circuit module 30 includes a low pass filter (LPF) 13, a driver IC 15, a coupler 16, a band pass filter (BPF) 17, and a memory 18. In addition, the circuit module 30 includes an Ethernet (Registered Trademark) PHY IC (Physical layer Integrated Circuit) 19 and an AC cycle detector 60.

The coupler 16 is connected to the power supply connector 21, and is further connected to the power line 1A through a power supply cable 1B, a power supply plug 25, and a receptacle 2. An LED 23 operates as a display unit, and is connected to the main IC 11. A LAN cable 26 for connection to various types of device (for example, a personal computer) is connected to a modular jack 22. The modular jack 22 is provided, for example, on the back surface of the housing 100. The LED 23 is provided, for example, on the front surface of the housing 100.

The main IC 11 includes a CPU (Central Processing Unit) 11A and PLC MAC (Power Line Communication Media Access Control layer) blocks 11C1 and 11C2. In addition, the main IC 11 includes PLC PHY (Power Line Communication Physical layer) blocks 11B1 and 11B2.

The CPU 11A has a 32-bit RISC (Reduced Instruction Set Computer) processor mounted therein. The PLC MAC block 11C2 manages a MAC layer (Media Access Control layer) of a transmission signal, and the PLC MAC block 11C1 manages a MAC layer of a received signal. The PLC PHY block 11B2 manages a PHY layer (Physical layer) of a transmission signal, and the PLC PHY block 11B1 manages a PHY layer of a received signal.

The AFE IC 12 includes a DA converter (DAC; Digital to Analog Converter) 12A, an AD converter (ADC; Analog to Digital Converter) 12D, and variable gain amplifiers (VGA) 12B and 12C.

The coupler 16 includes a coil transformer 16A and coupling capacitors 16B and 16C. Meanwhile, the CPU 11A controls operations of the PLC MAC blocks 11C1 and 11C2 and the PLC PHY blocks 11B1 and 11B2 using data which is stored in the memory 18, and controls the entirety of the PLC apparatus 10.

In FIG. 2, the PLC apparatus includes the PLC MAC blocks 11C1 and 11C2 and the PLC PHY blocks 11B1 and 11B2, and it is shown that these blocks are used for transmission and reception, respectively. Instead thereof, the PLC apparatus may include a PLC MAC block 11C and a PLC PHY block 11B (which are not shown), and may be used in common for transmission and reception.

Meanwhile, the PLC MAC blocks 11C1 and 11C2 are simply also referred to as the PLC MAC block 11C. The PLC PHY blocks 11B1 and 11B2 are also simply referred to as the PLC PHY block 11B.

Similarly to a general modem, the main IC 11 is, for example, an electrical circuit (LSI; Large Scale Integration) that performs signal processing including basic control or modulation and demodulation for data communication. For example, the main IC 11 modulates received data which is output from a communication terminal (for example, a PC) through the modular jack 22, and outputs the modulated data as a transmission signal (data) to the AFE IC 12. In addition, the main IC 11 demodulates a signal which is input from the power line 1A side through the AFE IC 12, and outputs the demodulated signal as a received signal (data) to a communication terminal (for example, a PC) through the modular jack 22.

The AC cycle detector 60 generates a synchronizing signal which is required for each of the PLC apparatuses 10 to perform control at a common timing. The AC cycle detector 60 includes a diode bridge 60a, resistors 60b and 60c, a DC (Direct Current) power supply unit 60e, and a capacitor 60d.

The diode bridge 60a is connected to the resistor 60b. The resistor 60b is connected in series to the resistor 60c. The resistors 60b and 60c are connected in parallel to one terminal of the capacitor 60d. The DC power supply unit 60e is connected to the other terminal of the capacitor 60d.

Specifically, the generation of the synchronizing signal by the AC cycle detector 60 is performed as follows. That is, the detector detects the zero-crossing point of a voltage having an alternating-current power waveform AC (alternating-current waveform composed of a sinusoidal wave of 50 Hz or 60 Hz) of a commercial power supply which is supplied to the power line 1A, and generates the synchronizing signal based on the timing of the zero-crossing point. An example of the synchronizing signal includes a square wave composed of a plurality of pulses synchronized with the zero-crossing point of an alternating-current power waveform.

Meanwhile, the AC cycle detector 60 is not essential. In this case, a synchronizing signal included in, for example, a communication signal is used in synchronization between the PLC apparatuses 10.

Communication by the PLC apparatus 10 is performed schematically as follows.

Data which is input from the modular jack 22 is sent to the main IC 11 through the Ethernet (Registered Trademark) PHY IC 19, and a digital signal is generated by performing digital signal processing. The generated digital signal is converted into an analog signal by the DA converter 12A of the AFE IC 12. The converted analog signal is output to the power line 1A through the low pass filter 13, the driver IC 15, the coupler 16, the power supply connector 21, the power supply cable 1B, the power supply plug 25, and the receptacle 2.

In addition, a signal which is received from the power line 1A is sent to the band pass filter 17 through the coupler 16, and is converted into a digital signal by the AD converter 12D after the gain thereof is adjusted by the variable gain amplifier 12C of the AFE IC 12. The converted digital signal is sent to the main IC 11, and is converted into digital data by performing digital signal processing. The converted digital data is output from the modular jack 22 through the Ethernet (Registered Trademark) PHY IC 19.

[Details of Communication System]

Next, the details of a communication system which is used by the communication system 1000 will be described.

Figure 3:
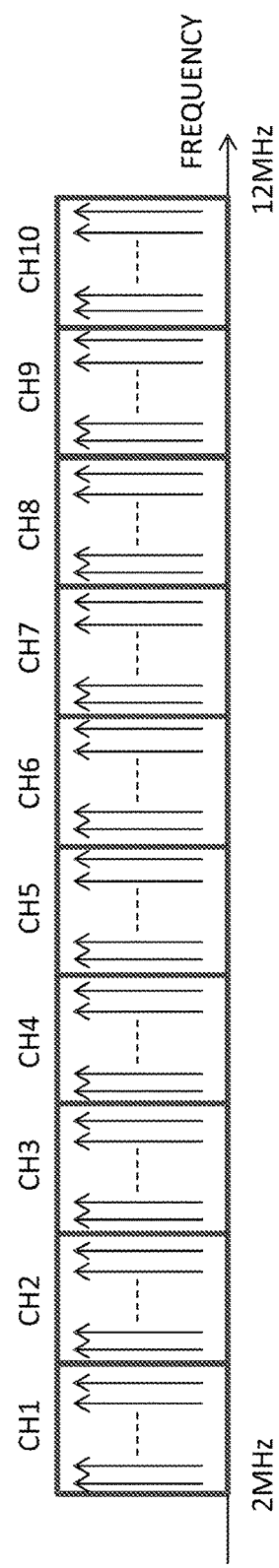
FIG. 3 is a schematic diagram illustrating an example of communication frequencies and communication channels which are used by the PLC apparatus.

FIG. 3 is a schematic diagram illustrating an example of communication frequencies and virtual channels (also referred to as communication channels) which are used by the PLC apparatus 10. In FIG. 3, 2 MHz to 12 MHz are illustrated as the bandwidth of communication frequencies. In addition, in the bandwidth of communication frequencies, a communication channel CH is divided per MHz, and ten communication channels CH (CH1 to CH10) are provided. Each of the communication channels CH has, for example, 32 subcarriers. Therefore, ten communication channels CH1 to CH10 have 320 subcarriers.

Meanwhile, the bandwidth of communication frequencies, the number of communication channels, and the number of subcarriers are an example, and may be other than these. The number of communication channels is two or more.

In addition, a communication frame FR which is communicated by the PLC apparatus 10 includes a preamble (PB), frame control (FC), and a frame body (Fb). The communication frame FR is formed in any array in a time domain and a frequency domain.

Data of the preamble (PB) is a fixed value, and all the data are, for example, "1". The preamble data is used in order to perform, for example, carrier detection, synchronization, or demodulation. Data of the frame control (FC) and the frame body (Fb) is an unfixed value.

In the present embodiment, one preamble is provided for each predetermined frequency bandwidth (for example, per MHz) in, for example, the communication frame FR. On the other hand, in the related art, the preamble is not divided for each communication channel, and one preamble is formed in common to all the communication channels.

The frame formats of the communication frame FR are different from each other depending on the frame mode (Frame mode) of the PLC apparatus 10. The frame mode includes a DOF (Diversity OFDM for Frame body) mode and a normal mode. For example, the frame mode is set by the PLC PHY block 11B2, and information of the set frame mode is stored in the memory 18.

The DOF mode is a mode in which a plurality of identical frame bodies are formed in the communication frame FR in consideration of the diversity. The DOF mode includes, for example, a DOF mode 1 to a DOF mode 8 which are described later. On the other hand, the normal mode is a mode in which one Fb is formed in the communication frame FR without considering the diversity.

FIGS. 4 to 12 are schematic diagrams illustrating an example of the communication frame FR in each frame mode. Each communication frame FR includes the same PB and FC for each communication channel. In each communication frame FR, formats relating to the Fb are different from each other.

Figure 4:
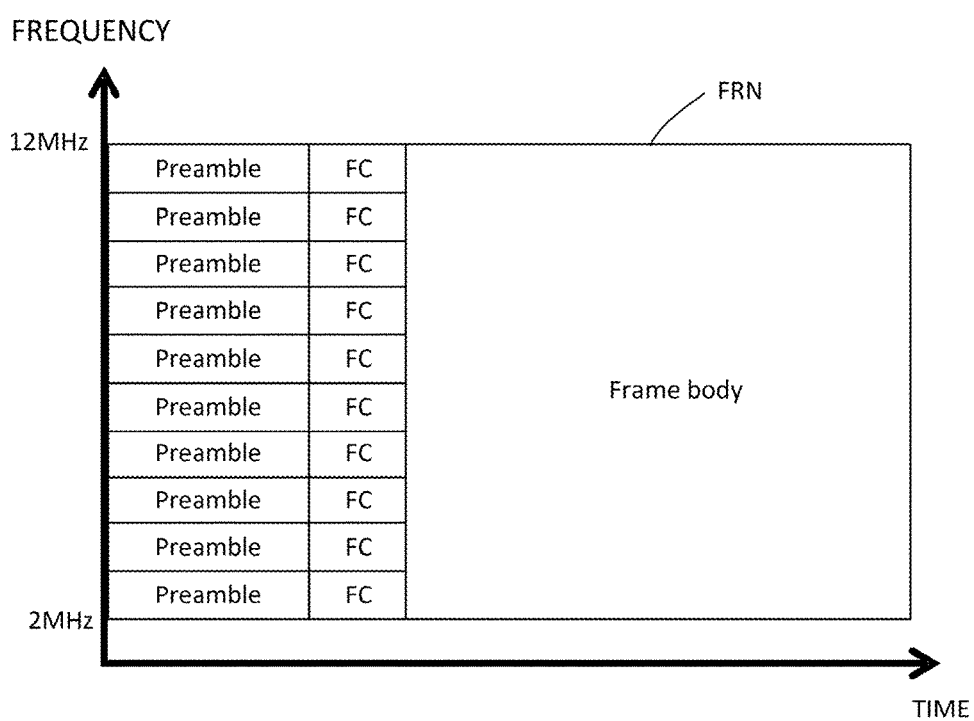
FIG. 4 is a schematic diagram illustrating a communication frame in a normal mode.

FIG. 4 illustrates a communication frame FRN in the normal mode. The communication frame FRN includes one Fb in a total of ten communication channels. That is, the diversity is not considered.

Figure 5:
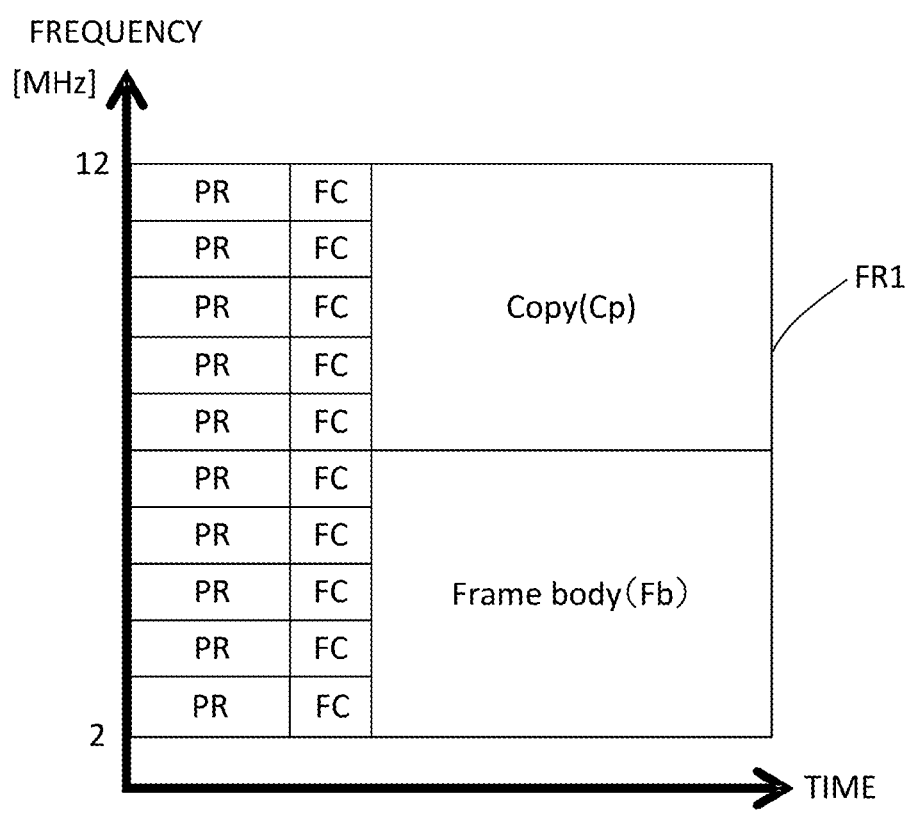
FIG. 5 is a schematic diagram illustrating a communication frame in a DOF mode 1.

FIG. 5 illustrates a communication frame FR1 in the DOF mode 1. In the communication frame FR1, the Fb is divided into two parts in a frequency direction. Therefore, the communication frame FR1 has two identical frame bodies (one copy (Cp)).

Figure 6:
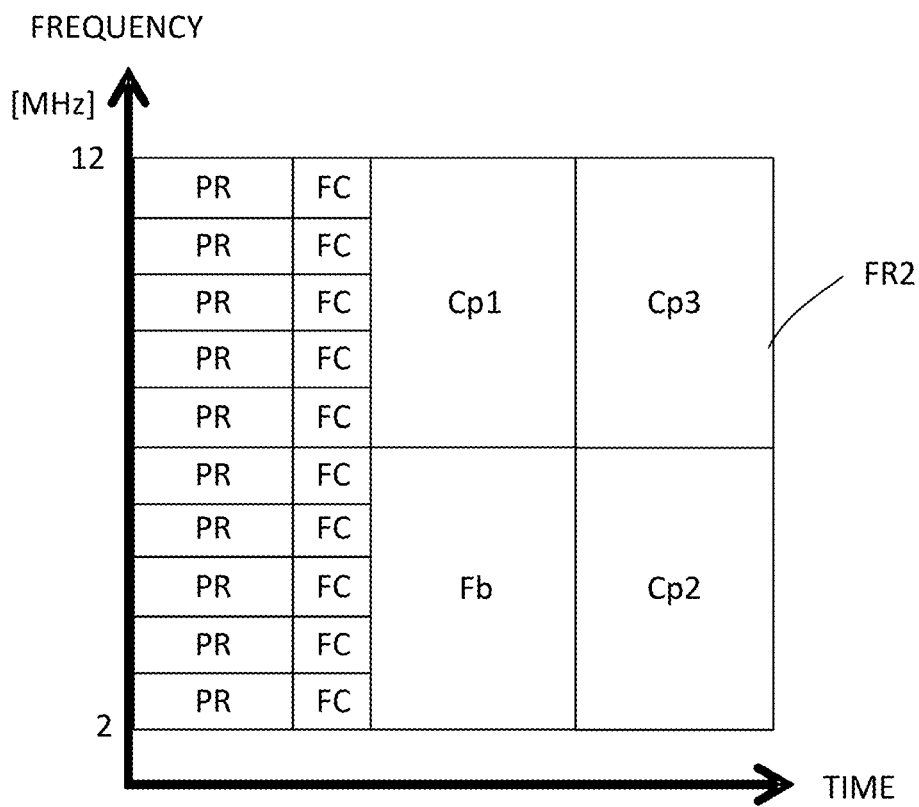
FIG. 6 is a schematic diagram illustrating a communication frame in a DOF mode 2.

FIG. 6 illustrates a communication frame FR2 in the DOF mode 2. In the communication frame FR2, the Fb is divided into two parts in a frequency direction, and the Fb is divided into two parts in a time direction. Therefore, the communication frame FR2 has four identical frame bodies (three copies).

Figure 7:
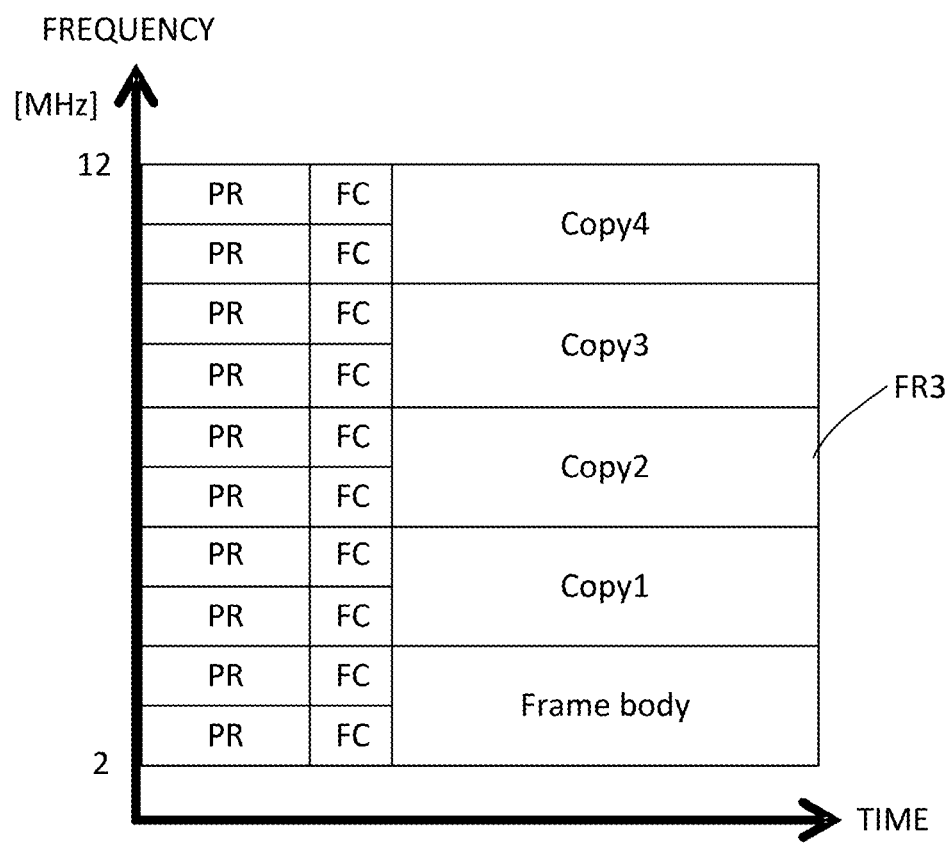
FIG. 7 is a schematic diagram illustrating a communication frame in a DOF mode 3.

FIG. 7 illustrates a communication frame FR3 in the DOF mode 3. In the communication frame FR3, the Fb is divided into five parts in the frequency direction. Therefore, the communication frame FR3 has five identical frame bodies (four copies).

Figure 8:
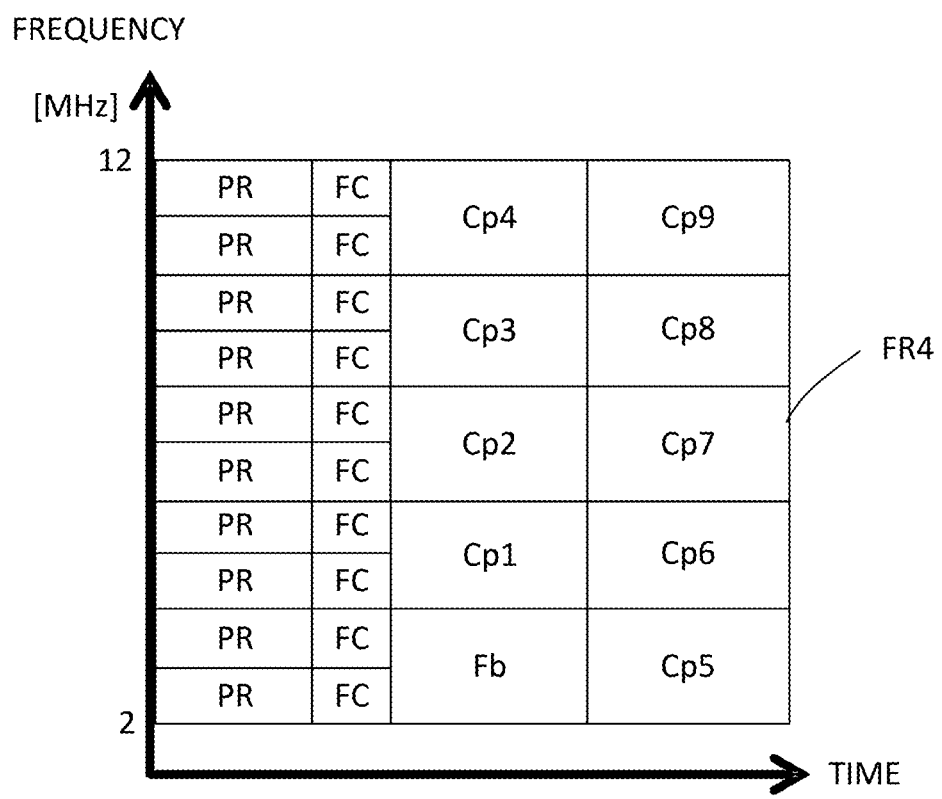
FIG. 8 is a schematic diagram illustrating a communication frame in a DOF mode 4.

FIG. 8 illustrates a communication frame FR4 in the DOF mode 4. In the communication frame FR4, the Fb is divided into five parts in the frequency direction, and the Fb is divided into two parts in the time direction. Therefore, the communication frame FR2 has ten identical frame bodies (nine copies).

Figure 9:
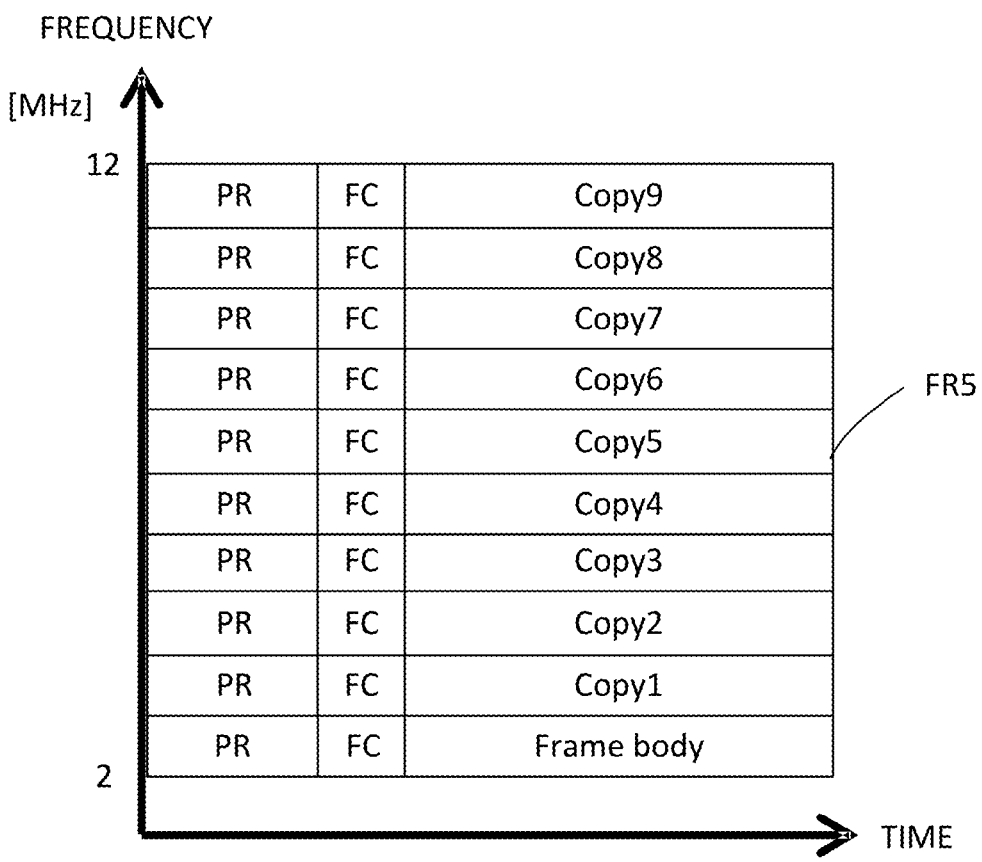
FIG. 9 is a schematic diagram illustrating a communication frame in a DOF mode 5.

FIG. 9 illustrates a communication frame FR5 in the DOF mode 5. In the communication frame FR5, the Fb is divided into ten parts in the frequency direction. Therefore, the communication frame FR5 has ten identical frame bodies (nine copies).

Figure 10:
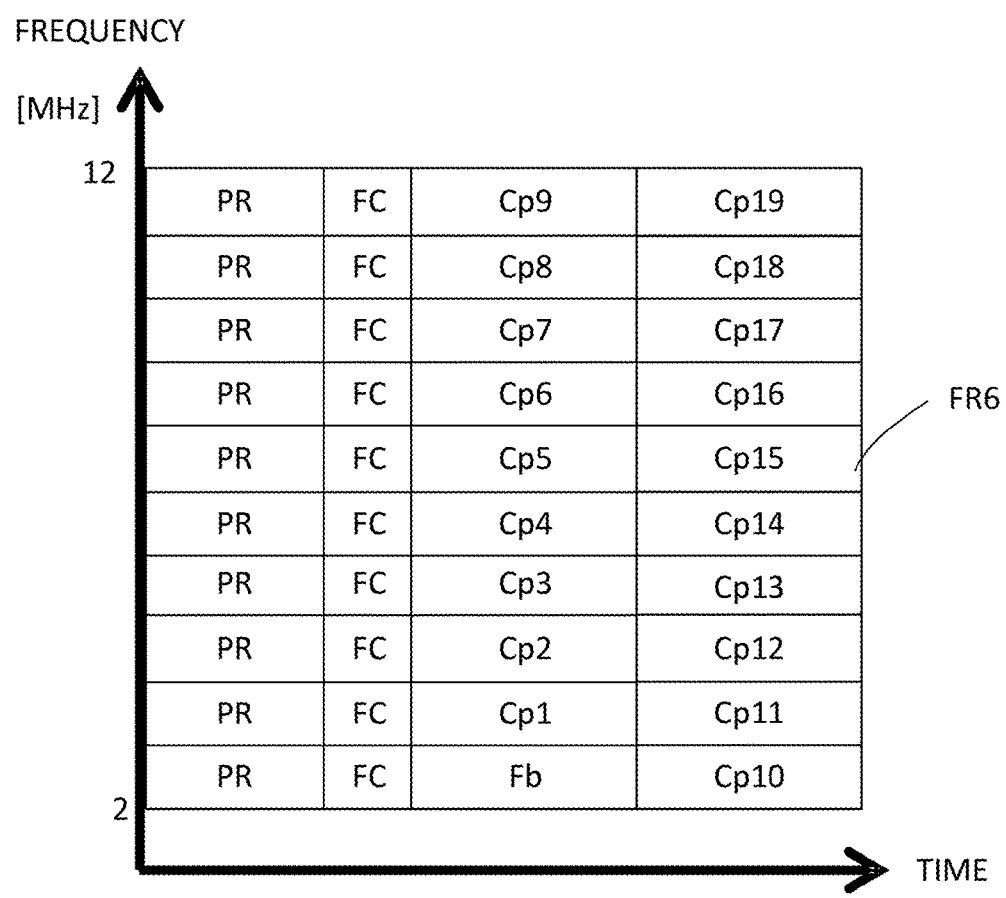
FIG. 10 is a schematic diagram illustrating a communication frame in a DOF mode 6.

FIG. 10 illustrates a communication frame FR6 in the DOF mode 6. In the communication frame FR6, the Fb is divided into ten parts in the frequency direction, and the Fb is divided into two parts in the time direction. Therefore, the communication frame FR2 has twenty identical frame bodies (nineteen copies).

Figure 11:
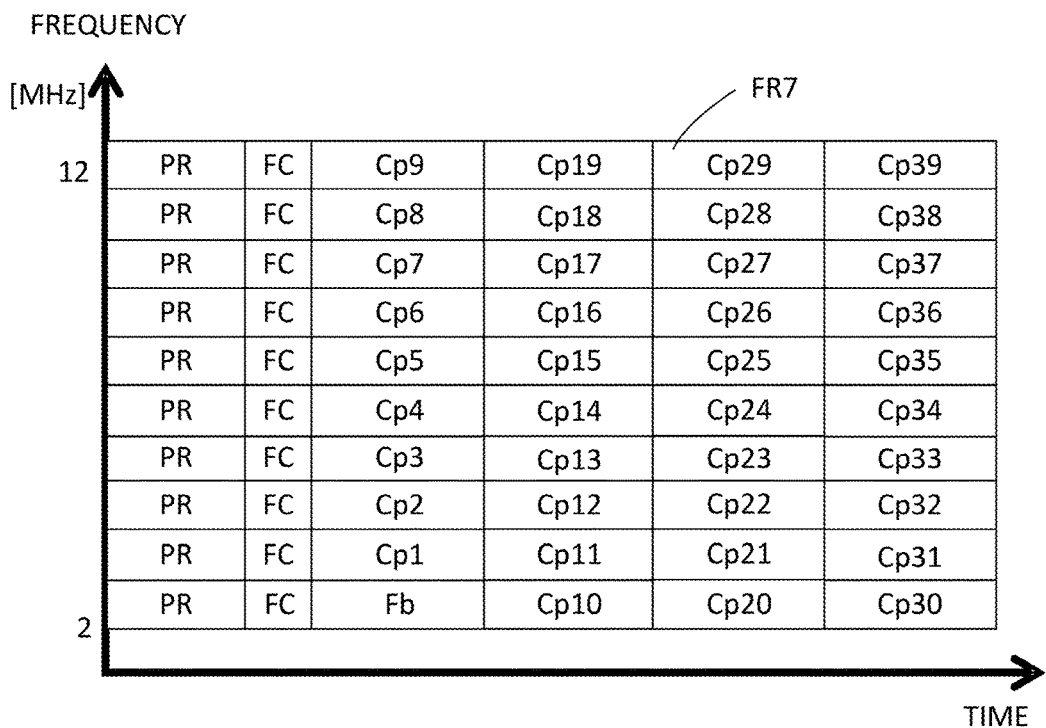
FIG. 11 is a schematic diagram illustrating a communication frame in a DOF mode 7.

FIG. 11 illustrates a communication frame FR7 in the DOF mode 7. In the communication frame FR7, the Fb is divided into ten parts in the frequency direction, and the Fb is divided four parts in the time direction. Therefore, the communication frame FR7 has forty identical frame bodies (thirty-nine copies).

Figure 12:
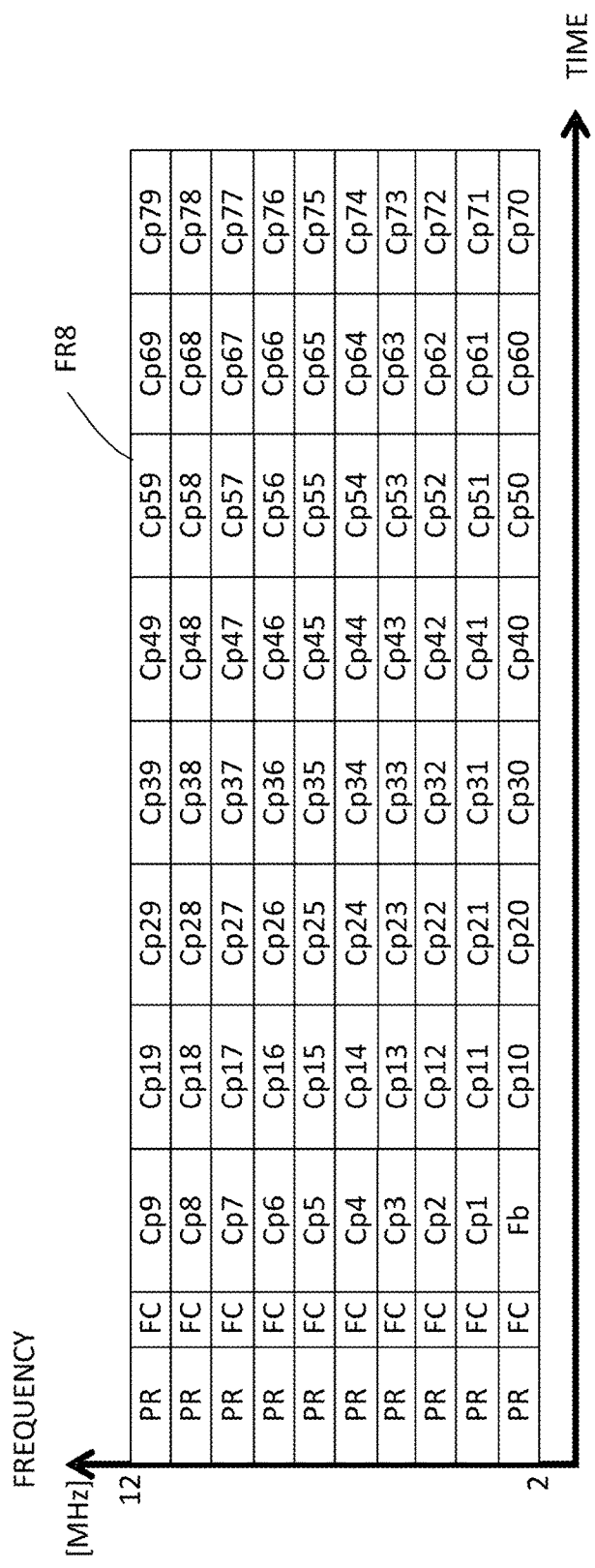
FIG. 12 is a schematic diagram illustrating a communication frame in a DOF mode 8.

FIG. 12 illustrates a communication frame FR8 in the DOF mode 8. In the communication frame FR8, the Fb is divided into ten parts in the frequency direction, and the Fb is divided into eight parts in the time direction. Therefore, the communication frame FR8 has eighty identical frame bodies (seventy-nine copies).

Figure 13:
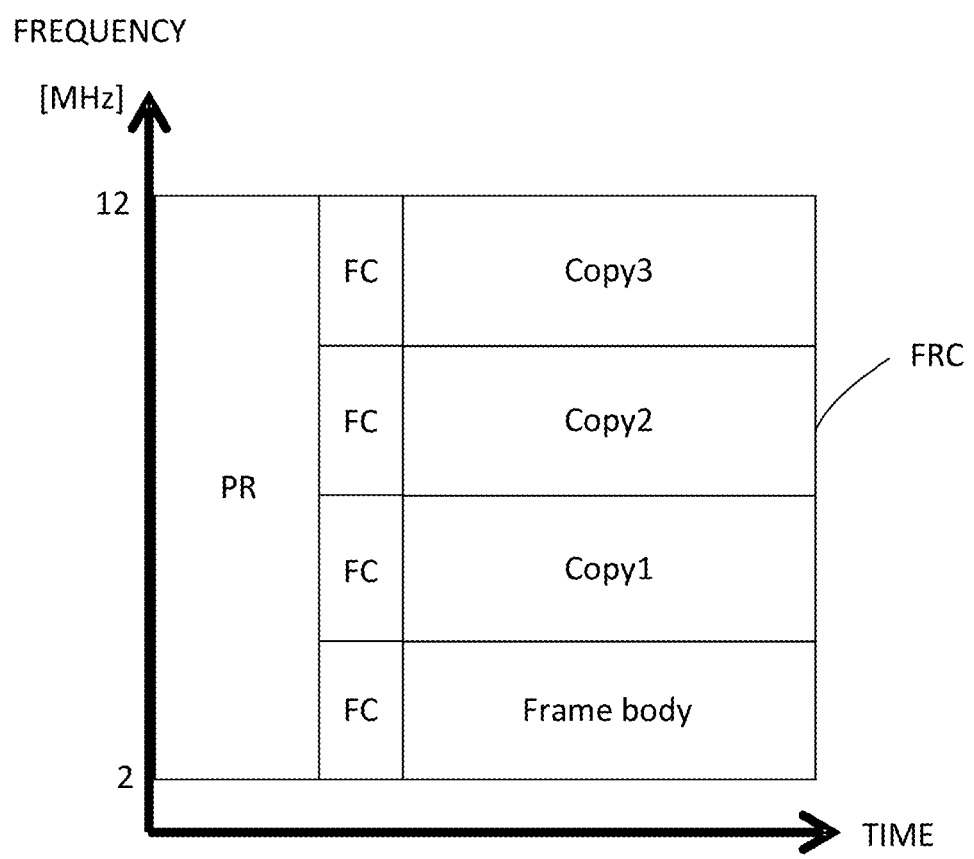
FIG. 13 is a schematic diagram illustrating a communication frame of a comparative example.

Meanwhile, FIG. 13 illustrates a communication frame FRC of a comparative example. In the communication frame FRC, PR is not divided in the frequency direction, and one PR is formed. In addition, the FC and the Fb are divided into four parts in the frequency direction. The communication frame FRC is adopted in, for example, a shape of a frame format of the related art.

The frame formats of the communication frame shown in FIGS. 4 to 12 are an example, and other frame formats may be adopted.

Meanwhile, the communication frame FR becomes longer in the DOF modes 7 and 8 in the time direction than in other DOF modes, but the length of the communication frame FR is arbitrary in each of the DOF modes. Therefore, the communication frame FR in, for example, the DOF mode 1 or the normal mode may be longer in the time direction than the communication frame FR in the DOF modes 7 and 8.

The class of the DOF mode, that is, the frame format of the communication frames FR1 to FR8 can be arbitrarily selected. For example, the PLC PHY block 11B selects and sets the frame format of any of the communication frames FR1 to FR8 with the addition of the viewpoint of robustness and a transmission rate, and holds setting information in the memory 18.

In this case, the PLC PHY block 11B estimates, for example, the state of the power line 1A as the transmission path, and calculates a transmission rate, an error rate or the like. The PLC PHY block 11B selects a frame format satisfying a predetermined communication reference held in the memory 18, in accordance with the estimation result of the state of the power line 1A.

For example, as the number of frame bodies (the number of copies of the Fb) becomes larger, the robustness improves, and the transmission rate deteriorates. On the other hand, as the number of frame bodies (the number of copies of the Fb) becomes smaller, the robustness decreases, and the transmission rate improves. The Fb is divided in at least one of the frequency direction and the time direction as in the communication frames FR1 to FR8.

In addition, the PLC PHY block 11B may be determined in accordance with the priority of transmitted data. For example, data having a relatively high priority (for example, data having a high real time) increases the number of copies of the Fb. On the other hand, data having a relatively low priority (for example, data having low real time) reduces the number of copies of the Fb. Information of the class of data (priority of data or the like) is stored in, for example, the FC in the communication frame.

Therefore, when the information of the class of data is stored in the FC by the PLC PHY block 11B2 of the PLC apparatus 10 on the transmission side, the PLC PHY block 11B1 of the PLC apparatus 10 on the receiving side confirms the FC on the receiving side, and thus it is possible to recognize of the class of received data, and to recognize the frame format. Meanwhile, when the transmission function of the PLC apparatus 10 is primarily brought into focus, the device is also referred to as a "PLC apparatus 10A". When the receiving function of the PLC apparatus 10 is primarily brought into focus, the device is also referred to as a "PLC apparatus 10B".

FIG. 14 is a schematic diagram in which an example of a communication system including a frame mode is compiled for each item. FIG. 14 illustrates the data type of data to be communicated, the number of symbols, a modulation system, an FEC mode, a frame mode, and a maximum PHY rate.

The data type includes, for example, PB, FC, and Fb. The modulation system includes, for example, PAM (Pulse Amplitude Modulation). The FEC (Forward Error Correction) mode includes, for example, CC (Concatenated Code), CC-RS (Reed Solomon code), and LDPC (Low Density Parity Check code). The frame mode includes information of the frame format of the communication frame. Meanwhile, the frame mode includes the DPF modes 1 to 8 and the normal mode which are described above.

As described above, in the DOF modes 1 to 8, two to eighty identical frame bodies can be used. Thereby, the PLC apparatus 10 can improve robustness.

In FIG. 14, the number of symbols is, for example, 8, 10, or 30 in the FC. The modulation system is, for example, 2 PAM. The FEC mode is, for example, CC (½), or RS (50, 34)-CC (½). The frame mode is, for example, FM (4, 1), FM (10, 4), or FM (10, 12).

Meanwhile, a value in the parentheses next to "CC" indicates a coding rate. In RS (x, y), x indicates the total number of symbols, and y indicates the number of redundant symbols. In FM (a, b), a indicates the number of partitions in the frequency direction, and b indicates the number of partitions in the time direction.

In the Fb in the DOF mode, the number of symbols is variable. The modulation system is, for example, 2 PAM. The FEC mode is, for example, CC (½), RS (56, 40)-CC (½), or LDPC (½). The frame mode is, for example, FM (2, 1), FM (2, 2), FM (4, 1), FM (5, 1), FM (5, 2), FM (10, 1), FM (10, 2), FM (10, 4), and FM (10, 8). Meanwhile, a value in the parentheses next to the "LDPC" indicates a coding rate.

Meanwhile, FM (2, 1) is equivalent to the DOF mode 1, and the maximum PHY rate is 4.9 (Mbps). FM (2, 2) is equivalent to the DOF mode 2, and the maximum PHY rate is 2.4 (Mbps). In FM (4, 1), the maximum PHY rate is 1.8 (Mbps). FM (5, 1) is equivalent to the DOF mode 3, and the maximum PHY rate is 2 (Mbps). FM (5, 2) is equivalent to the DOF mode 4, and the maximum PHY rate is 1 (Mbps). FM (10, 1) is equivalent to the DOF mode 5, and the maximum PHY rate is 1 (Mbps). FM (10, 2) is equivalent to the DOF mode 6, and the maximum PHY rate is 0.5 (Mbps). FM (10, 4) is equivalent to the DOF mode 7, and the maximum PHY rate is 0.2 (Mbps). FM (10, 8) is equivalent to the DOF mode 8, and the maximum PHY rate is 0.1 (Mbps).

In the Fb in the normal mode, the number of symbols is variable. The modulation system is, for example, 2 PAM to 32 PAM. The FEC mode is, for example, RS (255, 239), RS-CC (½ to ⅞), or LDPC (½ to ⅘). Since the frame mode is a normal mode, the number of frame bodies is one (no diversity). In the normal mode, the maximum PHY rate is 93 (Mbps).

[Generation and Selection of Phase Vector]

The PLC apparatus 10 adjusts the phase of data (for example, data of the PB) included in the communication frame FR using the phase vector, and performs communication using the communication frame FR. Here, the generation and selection of the phase vector which is used by the PLC apparatus 10 will be described.

The generation and selection of the phase vector may be performed by the PLC apparatus 10 itself, and may be performed by other devices. Here, it is illustrated that the generation and selection of the phase vector are performed by a PC (Personal Computer) (not shown) as other devices. Meanwhile, the PC includes a processor, a memory, a monitor, a communication interface, and the like.

The PC virtually reproduces, for example, the state of a transmission path assumed as the state of the power line 1A to which the PLC apparatus 10 is connected before the communication of the PLC apparatus 10, and performs the generation and selection of the phase vector. The PLC apparatus 10 acquires a phase vector generated from the PC and stores the phase vector in the memory 18 before the communication with another PLC apparatus 10. Information of the phase vector is shared between the PLC apparatus 10A and the PLC apparatus 10B. In the present embodiment, the shared phase vector is not changed in the communication.

The phase vector is indicated by, for example, M sequence. The M sequence is, for example, a sequence of length $2^n-1$. The phase vector is generated for each communication channel. Each element of the phase vector is used in the rotation of the phase of symbol data corresponding to a subcarrier, and has a value of, for example, "1" or "−1". Meanwhile, "n" determines the length of the M sequence.

FIG. 15 is a schematic diagram illustrating an example a relationship between each element of the phase vector and the amount of phase rotation. For example, conversion as the amount of phase rotation $\phi=0$ (rad) is performed when the element of the phase vector is "1", and conversion as the amount of phase rotation $\phi=\pi$ (rad) is performed when the element of the phase vector is "−1". Meanwhile, in the phase vector, the quota of "1" and the quota of "−1" are substantially the same numbers.

For example, when 32 subcarriers are present in one communication channel, one phase vector having 32 elements is generated. Meanwhile, two subcarriers next to each other are set to a carrier pair, and the phase vector may be generated in units of carrier pairs. For example, when 16 carrier pairs are present in one communication channel, a phase vector having 16 elements is generated. That is, the value of each element of the phase vector is set in advance for each subcarrier. The carrier pair is used when the PLC apparatus 10 performs wavelet transform.

The PC multiplies predetermined symbol data (for example, the entire PB of "1"), for example, by a first phase vector which is generated, and generates a multi-carrier signal of the communication channel CH1. The PC virtually passes the generated multi-carrier signal of the communication channel CH1 through the power line 1A, and calculates the PAPR of the multi-carrier signal of the communication channel CH1 on the receiving apparatus. In the present embodiment, the PC selects a parameter equivalent to the state of the transmission path of the power line 1A being inferior, and performs simulation.

The PC performs a left shift or a right shift on each element of the generated phase vector, and generates a new phase vector. For example, when the number of elements of the phase vector is 32, it is possible to generate 32 kinds of different phase vectors. Meanwhile, when wavelet transform is used, elements next to each other have the same value. Therefore, the number of elements of the phase vector is set to 16, and 16 kinds of different phase vectors may be generated. Here, as an example, it is assumed that wavelet transform is used, and that 16 kinds of phase vectors are used.

Similarly to the above-mentioned method, the PC generates 16 kinds of multi-carrier signals of the communication channel CH1 using 16 kinds of phase vectors. The PC virtually passes the signals through the power line 1A, and calculates 16 kinds of PAPRs of the multi-carrier signals on the receiving apparatus.

In addition, since the respective subcarriers in the communication channel CH1 are different from each other in frequency, the change of the phase vector by shifting each element of the phase vector causes a change in the signal level of the multi-carrier signal of the communication channel CH1 even when the same symbol data is targeted. The PC selects a phase vector having a PAPR equal to or less than a predetermined value th1 among a plurality of (for example, 16) PAPRs, and holds the phase vector in the memory of the PC.

Similarly, the PC repeats the selection of a phase vector for each communication channel CH. For example, when the number of communication channels CH is ten, the PC selects a phase vector having a PAPR equal to or less than the predetermined value (for example, minimum) with respect to each of the communication channels CH1 to CH10, and holds the phase vector in the memory of the PC.

In this manner, the PC selects an individual optimum phase vector for each communication channel CH. As the individual optimum phase vector, five more or less patterns in which the PAPR on the receiving apparatus is equal to or less than the predetermined value th1 are selected, for example, for each communication channel CH.

The PC selects one phase vector from the individual optimum phase vector selected for each communication channel CH. The PC compounds multi-carrier signals for each communication channel CH using phase vectors of a selected combination, and generates a multi-carrier signal of the communication frame FR. Since the frequency bandwidths of the respective communication channels CH are different from each other when the multi-carrier signal of the respective communication channels CH are compounded, a time position at which a signal level is set to a peak is newly generated. For this reason, the PC virtually passes the multi-carrier signal of the communication frame FR through the power line 1A, and calculates the PAPR of the multi-carrier signal of the communication frame FR on the receiving apparatus.

The PC selects another phase vector from the individual optimum phase vector selected for each communication channel CH, and changes a combination of the phase vectors for each communication channel CH. The multi-carrier signals for each communication channel CH are compounded using the phase vectors of the changed combination, and a multi-carrier signal of the communication frame FR is generated. The PC virtually passes the multi-carrier signal of the communication frame FR through the power line 1A, and calculates the PAPR of the multi-carrier signal of the communication frame FR on the receiving apparatus.

In this manner, the PC sequentially changes and selects a combination of the phase vectors for each communication channel CH. Therefore, various values are obtained as the PAPR of the multi-carrier signal of the communication frame FR on the receiving apparatus. The PC selects a phase vector in which the PAPR of the multi-carrier signal of the communication frame FR on the receiving apparatus is equal to or less than a predetermined value th2, and holds the phase vector in the memory of the PC. Meanwhile, the predetermined value th2 may be the same as or different from the predetermined value th1.

In this manner, the PC selects a combination of optimum (overall optimum) phase vectors as the entire communication frame FR, among the combination of the individual optimum phase vectors for each communication channel CH. Thereby, the PC can select overall optimum phase vectors capable of suppressing deterioration in the PAPR on the receiving apparatus even when the state of the power line 1A deteriorates.

Meanwhile, only one or a plurality of overall optimum phase vectors may be selected. When a plurality of overall optimum phase vectors are selected, the selection thereof may be performed in accordance with a communication situation through the actual power line 1A by the PLC apparatus 10.

Meanwhile, a plurality of parameters indicating the state of the transmission path of the power line 1A used in simulation are prepared, and the PC may be calculate the overall optimum phase vector for each state of the transmission path which is assumed. In this case, in the PLC apparatus 10, the PLC PHY block 11B1 estimates the state of the power line 1A, and may select and use a phase vector in accordance with the estimation result.

Each of the PLC apparatuses 10 connected to the power line 1A acquires information of the overall optimum phase vectors selected by the PC. Each of the PLC apparatuses 10, for example, may acquire the information of the phase vectors using communication from the PC through the power line 1A, and may acquire the information through an external recording medium. Each of the PLC apparatuses 10 holds the acquired information of the phase vectors in the memory 18, and appropriately refers to the information during communication.

[Operations and the Like]

Figure 16:
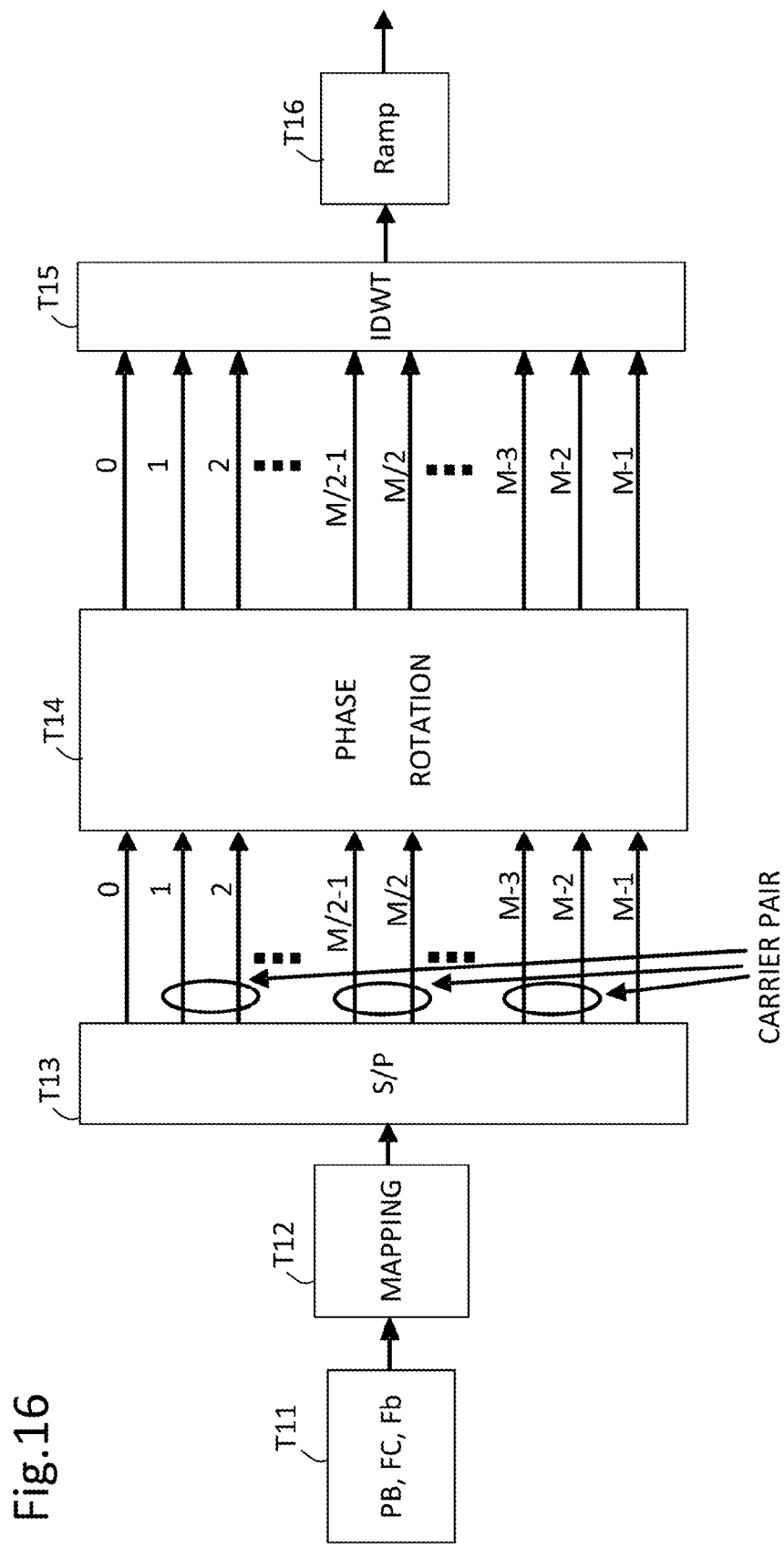
FIG. 16 is a schematic diagram illustrating a function example of a PLC PHY block for transmission of the PLC apparatus.

Next, operations of the PLC apparatus 10A during transmission using the selected phase vector will be described. FIG. 16 is a schematic diagram illustrating an operation example of the PLC PHY block 11B2. In FIG. 16, it is assumed that the PLC apparatus 10A transmits OFDM using wavelet transform.

The PLC PHY block 11B2 inputs bit data of PR, FC, and Fb included in the communication frame FR in order (T11).

The PLC PHY block 11B2 performs symbol mapping (for example, PAM modulation) on the input bit data, and obtains serial symbol data (T12). Meanwhile, modulation systems other than the PAM may be used.

The PLC PHY block 11B2 inputs the mapped serial symbol data, and converts the input serial symbol data into parallel symbol data (T13). Each pieces of the symbol data is allocated to a corresponding subcarrier. Here, the subcarrier is indicated as 0, 1, 2, . . . , (M/2−1), (M/2), . . . , (M−3), (M−2), and (M−1).

Meanwhile, in FIG. 16, a carrier pair is formed by two subcarriers next to each other. In FIG. 16, the number of carrier pairs is 16 for each communication channel CH, and the number of subcarriers is 32. In addition, in FIG. 16, although a subcarrier of one communication channel CH is shown, the communication channels CH having a number included in the communication frame FR are present in reality, but are not shown.

The PLC PHY block 11B2 multiplies symbol data allocated to each subcarrier by each element of the phase vector held in the memory 18 (T14). That is, the PLC PHY block 11B2 rotates or does not rotate the phase of the symbol data for each subcarrier, and adjusts the phase. This phase vector is for example, the overall optimum phase vector selected by the PC, as described above. The phase-adjusted symbol data is an example of communication data.

The PLC PHY block 11B2 performs inverse discrete wavelet transform (IDWT) on parallel symbol data which is multiplied by the phase vector, and generates data on a time axis (T15). That is, the PLC PHY block 11B2 generates a sampling value of a time axis waveform, and generates a sampling value sequence indicating a transmission symbol.

The PLC PHY block 11B2 performs a Ramp process on the generated data on a time axis. The Ramp process is, for example, a process of smoothing a rise in a signal waveform on a time axis in the head of the communication frame so that a signal is not distorted by an amplification process performed by the variable gain amplifier 12B. In the Ramp process, for example, a value between 0 and 1 is multiplied by the data on a time axis. The data on which the Ramp process is performed is sent to the DA converter 12A of an AFE IC 12.

In this manner, the PLC apparatus 10A adjusts the phase of the symbol data using the phase vector selected by assuming an inferior transmission path, and thus it is possible to improve the reduction performance of the PAPR on the receiving apparatus in each of the communication channels CH and the communication frame FR. In addition, the PLC apparatus 10A improves the reduction performance of the PAPR, and thus it is possible to speed up the convergence speed of the variable gain amplifier 12B on the receiving apparatus, and to effectively utilize the dynamic range of the AD converter 12D.

Figure 17:
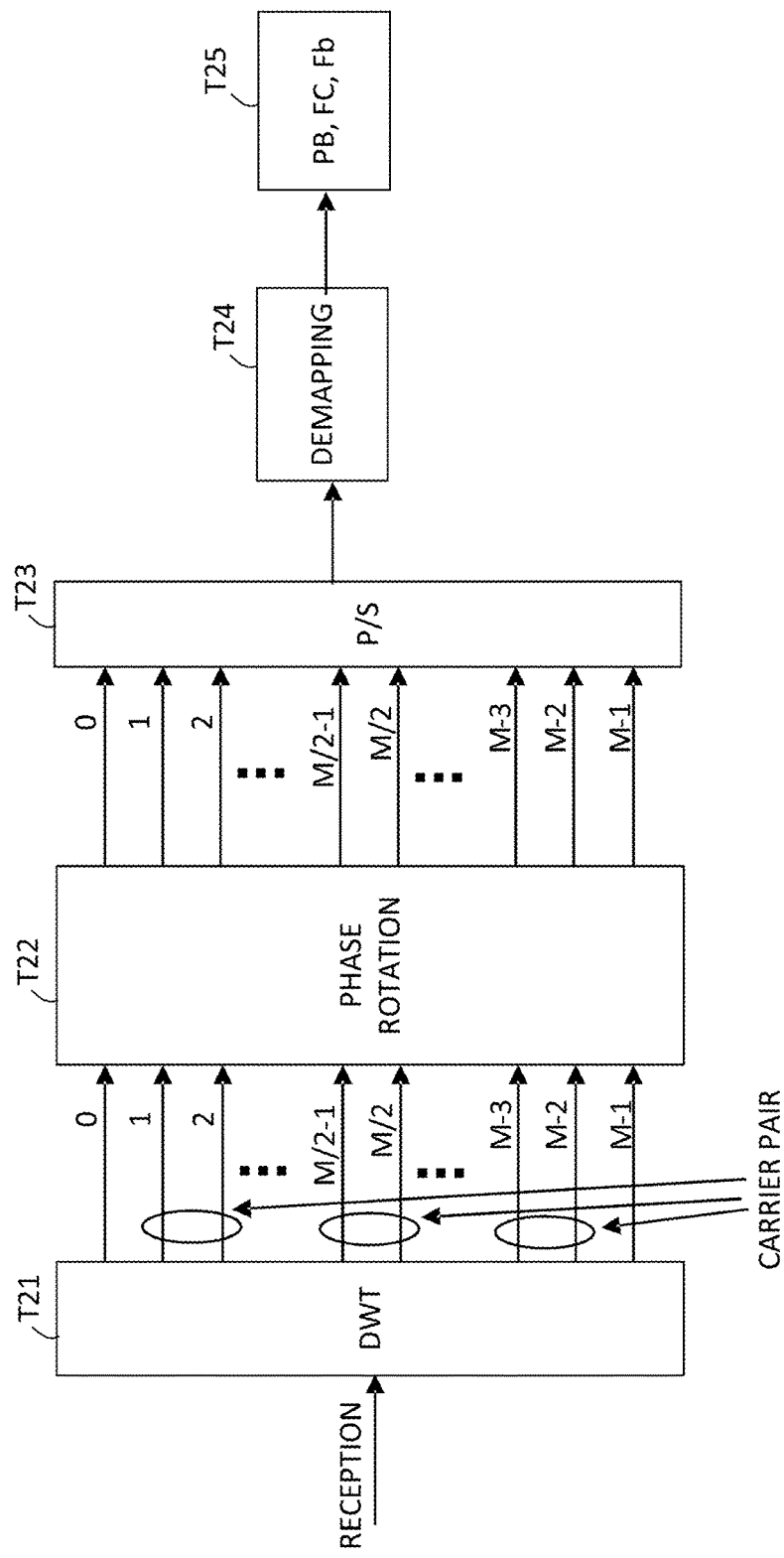
FIG. 17 is a schematic diagram illustrating a function example of a PLC PHY block for reception of the PLC apparatus.

Next, operations of the PLC apparatus 10B during reception using the selected phase vector will be described. FIG. 17 is a schematic diagram illustrating an operation example of the PLC PHY block 11B1. In FIG. 17, it is assumed that the PLC apparatus 10B transmits OFDM using wavelet transform.

The AFE IC 12 detects and receives analog data through carrier detection. The AD converter 12D converts the analog data into digital data. The PLC PHY block 11B1 performs discrete wavelet transform (DWT) on the converted digital data (T21).

Parallel symbol data allocated to each subcarrier is obtained by the discrete wavelet transform. Here, the subcarrier is indicated by 0, 1, 2, . . . , (M/2−1), (M/2), . . . , (M−3), (M−2), and (M−1).

Meanwhile, in FIG. 17, a carrier pair is formed by two subcarriers next to each other. In FIG. 17, the number of carrier pairs is 16 for each communication channel CH, and the number of subcarriers is 32. In addition, in FIG. 17, although a subcarrier of one communication channel CH is shown, the communication channels CH having a number included in the communication frame FR are present in reality, but are not shown.

The PLC PHY block 11B1 multiplies parallel symbol data allocated to each subcarrier by each element of the phase vector held in the memory 18 (T22). That is, the PLC PHY block 11B1 rotates or does not rotate the phase of the symbol data for each subcarrier, and adjusts (restores, herein) the phase. This phase vector is for example, the overall optimum phase vector selected by the PC, as described above.

The PLC PHY block 11B1 converts the parallel symbol data allocated to each of the phase-restored subcarriers into serial symbol data (T23).

The PLC PHY block 11B1 performs symbol demapping (for example, PAM demodulation) on the serial symbol data, and obtains bit data (T24). The PLC PHY block 11B1 outputs the bit data (for example, PB, FC, and Fb) for the purpose of a subsequent process (T25).

In this manner, the PLC apparatus 10B adjusts (restores) the phase of the symbol data using the phase vector selected by assuming an inferior transmission path, and thus it is possible to improve the reduction performance of the PAPR in each of the communication channels CH and the communication frame FR. In addition, the PLC apparatus 10B improves the reduction performance of the PAPR, and thus it is possible to speed up the convergence speed of the variable gain amplifier 12B, and to effectively utilize the dynamic range of the AD converter 12D.

Meanwhile, since the PLC apparatus uses the same phase vector during transmission and reception, and the components of the phase vector are offset and deleted.

[Effects and the Like]

The PLC apparatus 10A and the PLC apparatus 10B communicate data through the power line 1A as the transmission path. When the state of the power line 1A is ameliorated, little deterioration in a communication signal occurs. Therefore, when a phase vector having a low PAPR is selected by the PLC apparatus 10A, the PAPR also becomes lower on the PLC apparatus 10B.

In addition, even when the state of the power line 1A is deteriorated, the individual optimum and overall optimum phase vectors selected by the PC or the like are set to the PLC apparatus 10, and thus the PLC apparatus 10 can suppress deterioration in PAPR on the receiving apparatus.

For example, it is assumed that the PLC apparatus 10 sets the same PB (for example, "1" entirely) for each communication channel CH. Even in this case, the PLC apparatus 10 adjusts the phase of the symbol data using a different phase vector for each communication channel CH, and thus it is possible to prevent the signal voltage of the composite wave of the PB from becoming excessive for each communication channel CH, and to prevent the signal voltage of the composite wave of the PB from becoming excessive as the entirety of the communication frame FR. Thus, deterioration in PAPR on the receiving apparatus is suppressed.

Figure 18:
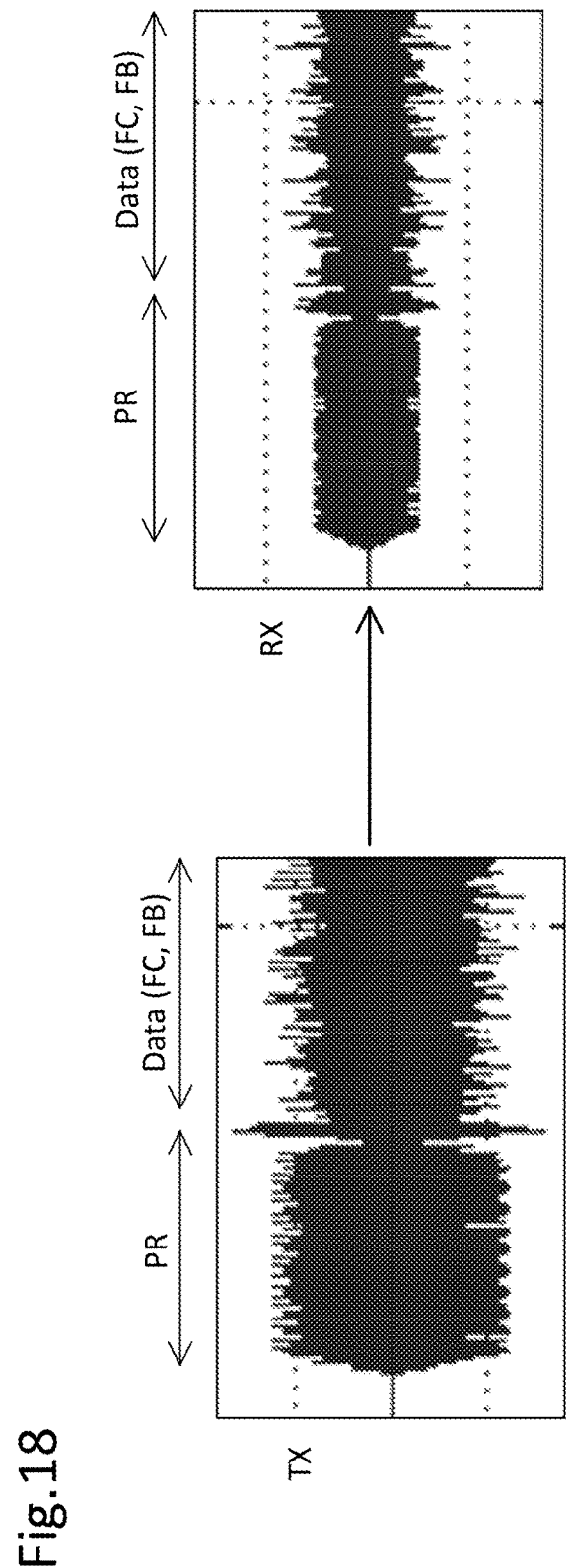
FIG. 18 is a waveform diagram illustrating an example of a relationship between a time and a signal voltage on the transmission apparatus and a relationship between a time and a signal voltage on the receiving apparatus, when the state of a power line is deteriorated, in the first embodiment.

FIG. 18 is a waveform diagram illustrating an example of a relationship between a time and a signal voltage in the PLC apparatus 10A and a relationship between a time and a signal voltage in the PLC apparatus 10B, when the state of the power line 1A of the present embodiment is deteriorated.

As shown in FIG. 18, in a preamble of a received signal in the PLC apparatus 10B (RX), a difference between a time position having a high signal voltage and a time position having a low signal voltage becomes smaller, that is, a difference (PAPR) between peak power and average power of the received signal becomes smaller.

The dynamic range of the AD converter 12D is set in accordance with the widths of the maximum value and the minimum value of a signal voltage shown in FIG. 18. For this reason, when the PAPR in the PLC apparatus 10B becomes lower, it is possible to improve the usability of the dynamic range of the AD converter 12D of the PLC apparatus 10B, and to prevent the S/N ratio of the communication frame from deteriorating. Thus, it is not necessary to include an amplifier having a wide dynamic range as the AD converter 12D.

Therefore, even when the state of a transmission path is deteriorated, the PLC apparatus 10 can improve the reduction performance of the PAPR on the receiving apparatus. In addition, the PLC apparatus 10 can improve the reduction performance of the PAPR of the received signal, and thus it is possible to prevent the accuracy of decoding performed by the PLC apparatus 10B from deteriorating, and to improve the reproducibility of a signal.

In addition, a phase vector in which the PAPR for each of the communication channels CH is set to be equal to or less than the predetermined value th1 is set as the phase vector of each of the communication channels CH. In addition, a phase vector in which the PAPR for the communication frame FR is set to be equal to or less than the predetermined value th2 is set as the phase vector of the entire communication frame FR in which each of the communication channels CH is compounded. That is, the individual optimum and overall optimum phase vectors are set in each of the PLC apparatuses 10.

Thus, the PLC apparatus 10 adjusts a phase using the phase vector selected assuming the state of an inferior transmission path for each communication channel CH and in the entire communication frame FR, and thus it is possible to reduce the PAPR on the receiving apparatus. Thereby, the PLC apparatus 10 can effectively utilize the dynamic range of the AD converter 12D, and thus it is possible to prevent the S/N ratio of the communication frame from deteriorating.

Second Embodiment

In the first embodiment, a case has been illustrated in which the phase vector is set in advance and is not changed. In a second embodiment, it is assumed that a phase is adjusted by switching the phase vector. Meanwhile, in the present embodiment, the same particulars as those in the first embodiment will not be described below.

In the present embodiment, the same information of phase vectors as the information of the phase vectors in the first embodiment is stored in the memory 18. The information of phase vectors (conventional phase vectors) used in case that the communication frame FR is the communication frame FRC is also stored in the memory 18. The PLC PHY block 11B of the PLC apparatus 10 sets any of the phase vectors in the memory 18 as phase vectors used in communication in accordance with the number of the preambles included in the communication frame FR. In addition, the PLC PHY block 11B changes the phase vectors which are set, when the number of the preambles included in the communication frame FR has changed. The setting information of the phase vectors is stored in the memory 18.

In the present embodiment, the PLC apparatus 10B receives the communication frames FRN and FR1 to FR8 or the communication frame FRC of the comparative example which is described in the first embodiment.

In the communication frames FRN and FR1 to FR8 and the communication frame FRC, the numbers of preambles are different from each other. For example, the number of preambles is ten in the communication frames FRN and FR1 to FR8, and the number of preambles is one in the communication frame FRC. For this reason, the PLC apparatus 10B pays attention to the number of preambles, and thus can distinguish between the communication frames FR1 to 8 of the first embodiment and the communication frame FRC of the comparative example.

When the communication frame is detected by carrier detection, the PLC PHY block 11B1 of the PLC apparatus 10B determines the format of the preamble included in the communication frame. When the preamble included in the communication frame is determined to be set for each frequency bandwidth (for each communication channel), the PLC PHY block 11B1 determines whether the received communication frame FR is any of the communication frames FRN and FR1 to FR8. That is, the received communication frame is determined to be a communication frame FR to which the first embodiment is applied.

On the other hand, when one preamble included in the communication frame FR is determined to be set in the entire frequency bandwidth (entire communication channel), the PLC PHY block 11B1 determines that the received communication frame FR is the communication frame FRC. That is, the received communication frame is determined to be the communication frame FRC of the comparative example.

The PLC PHY block 11B1 acquires information of the phase vector based on the determined communication frame FR from the memory 18, and restores the phase of the symbol data using the acquired phase vector. Therefore, even when plural kinds of received communication frames FR are present, the PLC apparatus 10B can decode the communication frame FR.

In this manner, the PLC apparatus 10B determines the number of preambles of the communication frame FR, and thus the PLC apparatus 10A can determine whether being a PLC apparatus that handles the communication frame FRC of the comparative example or a PLC apparatus that handles the communication frames FRN and FR1 to FR8. The PLC apparatus 10B changes the phase vector in accordance with the form of the preamble.

Therefore, in the communication system 1000, even when the PLC apparatus (for example, PLC apparatus of the related art) that handles the communication frame FRC of the comparative example and the PLC apparatus 10 capable of applying the first embodiment are mixed, and the state of a transmission path is deteriorated, the PLC apparatus 10B can communicate with the PLC apparatus 10A by reducing the PAPR.

Other Embodiments

As stated above, the first and second embodiments have been described as an example of a technique in the present disclosure. However, the technique in the present disclosure is not limited thereto, and can also be applied to embodiments in which changes, substitutions, additions, omissions and the like are performed. In addition, the respective embodiments may be combined.

In the first and second embodiments, an example has been illustrated in which, when the PC or the like generates phase vectors, a plurality of different phase vectors are generated by generating one phase vector and then shifting each element. There is no limitation thereto, and, for example, the PC or the like may arbitrarily set the value of each element, and generate a plurality of different phase vectors.

In the first and second embodiments, an example has been illustrated in which the communication system 1000 is a power line communication system that performs communication in accordance with the power line communication system. Meanwhile, the communication system 1000 may be a communication system that performs communication in accordance with another communication system (for example, wireless LAN system).

In the first and second embodiments, an example has been illustrated in which data on the time axis and data on the frequency axis are converted by wavelet transform, but other conversions (for example, FFT (Fast Fourier Transform)) may be performed. In this case, an element of a different phase vector is used for each subcarrier.

In the first and second embodiments, considering the overall optimum, a plurality of communication channels CH to which the same phase vector is allocated may be present among all the communication channels CH (for example, ten communication channels). Even in this case, the PAPR of the entire communication channel may satisfy a predetermined reference.

In the first embodiment, a processor may be configured physically in any way. In addition, when a programmable processor is used, process contents can be changed by changing a program, and thus it is possible to increase the degree of freedom of a design of the processor. The processor may be constituted by one semiconductor chip, and may be constituted physically by a plurality of semiconductor chips. When the processor is constituted by a plurality of semiconductor chips, each control in the first and second embodiments may be realized by a separate semiconductor chip. In this case, it can be considered that one processor is constituted by the plurality of semiconductor chips. In addition, the processor may be constituted by a member (such as a capacitor) having a separate function from that of the semiconductor chip. In addition, one semiconductor chip may be configured to realize the function of the processor and other functions.

(Outline of an Aspect of the Present Disclosure)

A communication apparatus of an aspect of the present disclosure performs a communication using a communication frame FR corresponding to a predetermined frequency bandwidth including a first frequency bandwidth and a second frequency bandwidth. The communication apparatus includes a processor and a communicating device. The communication frame FR includes a first communication channel that corresponds to the first frequency bandwidth and that has a plurality of subcarriers and a second communication channel that corresponds to the second frequency bandwidth and that has a plurality of subcarriers. The processor sets a first phase vector with respect to the first communication channel, sets a second phase vector different from the first phase vector with respect to the second communication channel, and generates communication data by adjusting a phase of symbol data using the first phase vector and the second phase vector. The communicating device transmits the communication data using the communication frame FR.

The communication apparatus is, for example, the PLC apparatus 10. The processor is, for example, the main IC 11. The communicating device is, for example, a device, inclusive of the AFE IC 12, which is disposed closer to the power supply plug 25 side than the AFE IC 12. The first communication channel is, for example, the communication channel CH1. The second communication channel is, for example, the communication channel CH2.

Thereby, the communication apparatus adjusts a phase using a phase vector which is selected in advance for each communication channel and is selected in the entire communication frame, and thus it is possible to suppress deterioration in PAPR on the receiving apparatus even when the state of the transmission path is deteriorated. Therefore, the communication apparatus can improve the usability of the dynamic range of the AD converter on the receiving apparatus, and thus it is possible to prevent the S/N ratio of the communication frame from deteriorating.

In addition, in this communication apparatus, a phase vector in which a first Peak to Average Power Ratio (PAPR) relevant to reception in the first communication channel is equal to or less than a predetermined value may be set as the first phase vector. A phase vector in which a second PAPR relevant to reception in the second communication channel is equal to or less than a predetermined value may be set as the second phase vector. A phase vector in which a third PAPR relevant to reception in the communication frame FR including the first communication channel and the second communication channel is equal to or less than a predetermined value may be set as each of the first phase vector and the second phase vector.

Thereby, even when the state of a transmission path is inferior, the communication apparatus can adjust a phase using a phase vector adapted to each communication channel and the communication frame, and thus it is possible to improve reception performance.

In addition, in this communication apparatus, data which is transmitted in the first communication channel and the second communication channel may include data of a plurality of preambles having an identical value.

Thereby, the communication apparatus can reduce a signal level of a composite signal of a subcarrier relevant to data of a preamble having a tendency for a signal voltage to increase, through phase adjustment, and thus it is possible to improve the reduction performance of the PAPR on the receiving apparatus.

In addition, in this communication apparatus, the processor may change the first phase vector and the second phase vector when the number of preamble data transmitted in the communication frame FR changes.

Thereby, even when the entire communication frame FR is provided with data of a preamble without considering the communication channel, the communication apparatus can decode the data of a preamble on the receiving apparatus. That is, the communication apparatus is not limited to communication with the communication apparatus described in the above embodiment, and can also communicate with other communication apparatus using the phase vector of the related art.

In addition, in this communication apparatus, the communicating device may perform communication using the communication frame FR through the power line 1A.

Thereby, even when the state of the power line 1A is deteriorated, the communication apparatus can perform power line communication by reducing the PAPR on the receiving apparatus.

In addition, a communication method of an aspect of the present disclosure is a communication method of performing a communication using a communication frame FR corresponding to a predetermined frequency bandwidth including the first frequency bandwidth and the second frequency bandwidth. The communication frame FR includes the first communication channel that corresponds to the first frequency bandwidth and that has a plurality of subcarriers and the second communication channel that corresponds to the second frequency bandwidth and that has a plurality of subcarriers. The method includes setting a first phase vector with respect to the first communication channel, setting a second phase vector different from the first phase vector with respect to the second communication channel, and transmitting communication data using the communication frame FR by adjusting a phase of symbol data using the first phase vector and the second phase vector.

Thereby, the communication apparatus adjusts a phase using a phase vector which is selected in advance for each communication channel and is selected in the entire communication frame, and thus it is possible to suppress deterioration in PAPR on the receiving apparatus even when the state of the transmission path is deteriorated. Therefore, the communication apparatus can improve the usability of the dynamic range of the AD converter on the receiving apparatus, and thus it is possible to prevent the S/N ratio of the communication frame from deteriorating.

In addition, in this communication method, a phase vector in which a first Peak to Average Power Ratio (PAPR) relevant to reception in the first communication channel is equal to or less than a predetermined value may be set as the first phase vector. A phase vector in which a second PAPR relevant to reception in the second communication channel is equal to or less than a predetermined value may be set as the second phase vector. A phase vector in which a third PAPR relevant to reception in the communication frame FR including the first communication channel and the second communication channel is equal to or less than a predetermined value may be set as each of the first phase vector and the second phase vector.

Thereby, even when the state of a transmission path is inferior, the communication apparatus can adjust a phase using a phase vector adapted to each communication channel and the communication frame, and thus it is possible to improve reception performance.

In addition, in this communication method, data which is transmitted in the first communication channel and the second communication channel may include data of a plurality of preambles having an identical value.

Thereby, the communication apparatus can reduce a signal level of a composite signal of a subcarrier relevant to data of a preamble having a tendency for a signal voltage to increase, through phase adjustment, and thus it is possible to improve the reduction performance of the PAPR on the receiving apparatus.

In addition, in this communication method, the processor may change the first phase vector and the second phase vector when the number of preamble data transmitted in the communication frame FR changes.

Thereby, even when the entire communication frame FR is provided with data of a preamble without considering the communication channel, the communication apparatus can decode the data of a preamble on the receiving apparatus. That is, the communication apparatus is not limited to communication with the communication apparatus described in the above embodiment, and can also communicate with other communication apparatus using the phase vector of the related art.

In addition, in this communication method, the communicating device may perform communication using the communication frame FR through the power line 1A.

Thereby, even when the state of the power line 1A is deteriorated, the communication apparatus can perform power line communication by reducing the PAPR on the receiving apparatus.

The present application claims priorities from U.S. provisional patent application No. 62/083,810 filed on Nov. 24, 2014 and an international patent application No. PCT/JP2015/004992 filed on Sep. 30, 2015, the contents of which are hereby incorporated by reference into this application.

The present disclosure is useful in a communication apparatus, a communication method and the like which are capable of improving the reduction performance of a PAPR on the receiving apparatus even when the state of a transmission path is deteriorated.

What is claimed is:

1. A communication apparatus that performs communication using a communication frame corresponding to a frequency bandwidth including a first frequency bandwidth and a second frequency bandwidth, the communication apparatus comprising:
a processor; and
communication circuitry,
wherein the communication frame includes a first communication channel that corresponds to the first frequency bandwidth and that includes a plurality of subcarriers, and a second communication channel that corresponds to the second frequency bandwidth and that includes a plurality of subcarriers,
the processor sets a phase vector, in which a first Peak to Average Power Ratio (PAPR) relevant to reception in the first communication channel is equal to or less than a determined value, as a first phase vector for the first communication channel, and sets a phase vector, in which a second PAPR relevant to reception in the second communication channel is equal to or less than the determined value, as a second phase vector for the second communication channel, wherein the first and second phase vectors are different from each other and the first and second phase vectors satisfy that a third PAPR relevant to reception in the communication frame including the first and second communication channels is equal to or less than the determined value,
the processor generates communication data by adjusting a phase of symbol data using the first phase vector and the second phase vector, and
the communication circuitry transmits the communication data using the communication frame.

2. The communication apparatus according to claim 1, wherein data which is transmitted in the first communication channel and the second communication channel includes data of a plurality of preambles having an identical value.

3. The communication apparatus according to claim 1, wherein the communication circuitry performs communication using the communication frame through a power line.

4. A communication apparatus that performs communication using a communication frame corresponding to a frequency bandwidth including a first frequency bandwidth and a second frequency bandwidth, the communication apparatus comprising:
a processor; and
communication circuitry,
wherein the communication frame includes a first communication channel that corresponds to the first frequency bandwidth and that includes a plurality of subcarriers, and a second communication channel that corresponds to the second frequency bandwidth and that includes a plurality of subcarriers,
the processor sets a first phase vector for the first communication channel, sets a second phase vector different from the first phase vector for the second communication channel, and generates communication data by adjusting a phase of symbol data using the first phase vector and the second phase vector,
the communication circuitry transmits the communication data using the communication frame, and
the processor changes the first phase vector and the second phase vector when the number of preamble data transmitted in the communication frame changes.

5. The communication apparatus according to claim 4, wherein the communication circuitry performs communication using the communication frame through a power line.

6. The communication apparatus according to claim 4, wherein data which is transmitted in the first communication channel and the second communication channel includes data of a plurality of preambles having an identical value.

7. A communication method of performing communication using a communication frame corresponding to a frequency bandwidth including a first frequency bandwidth and a second frequency bandwidth,
the communication frame including a first communication channel that corresponds to the first frequency bandwidth and that includes a plurality of subcarriers, and a second communication channel that corresponds to the second frequency bandwidth and that includes a plurality of subcarriers,
the communication method comprising:
setting a phase vector, in which a first Peak to Average Power Ratio (PAPR) relevant to reception in the first communication channel is equal to or less than a determined value, as a first phase vector for the first communication channel,
setting a phase vector, in which a second PAPR relevant to reception in the second communication channel is equal to or less than the determined value, as a second phase vector for the second communication channel, wherein the first and second phase vectors are different from each other and the first and second phase vectors satisfy that a third PAPR relevant to reception in the communication frame including the first and second communication channels is equal to or less than the determined value,
generating communication data by adjusting a phase of symbol data using the first phase vector and the second phase vector, and
transmitting the communication data using the communication frame.

8. The communication method according to claim 7, wherein data which is transmitted in the first communication channel and the second communication channel includes data of a plurality of preambles having an identical value.

9. The communication method according to claim 7, wherein communication using the communication frame is performed through a power line.

10. A communication method of performing communication using a communication frame corresponding to a frequency bandwidth including a first frequency bandwidth and a second frequency bandwidth,
the communication frame including a first communication channel that corresponds to the first frequency bandwidth and that includes a plurality of subcarriers, and a second communication channel that corresponds to the second frequency bandwidth and that includes a plurality of subcarriers, the communication method comprising:

setting a first phase vector for the first communication channel;

setting a second phase vector different from the first phase vector for the second communication channel;

generating communication data by adjusting a phase of symbol data using the first phase vector and the second phase vector; and transmitting the communication data using the communication frame, wherein the first phase vector and the second phase vector are changed when the number of preamble data transmitted in the communication frame changes.

11. The communication method according to claim 10, wherein communication using the communication frame is performed through a power line.

12. The communication method according to claim 10, wherein data which is transmitted in the first communication channel and the second communication channel includes data of a plurality of preambles having an identical value.

* * * * *